United States Patent
Chang et al.

(10) Patent No.: US 9,269,187 B2
(45) Date of Patent: Feb. 23, 2016

(54) IMAGE-BASED 3D PANORAMA

(71) Applicants: Yao-Jen Chang, Princeton, NJ (US); Ronny Bismark, Luegde (DE)

(72) Inventors: Yao-Jen Chang, Princeton, NJ (US); Ronny Bismark, Luegde (DE)

(73) Assignee: Siemens Product Lifecycle Management Software Inc., Plano, TX (US)

(*) Notice: Subject to any disclaimer, the term of this patent is extended or adjusted under 35 U.S.C. 154(b) by 253 days.

(21) Appl. No.: 13/940,080

(22) Filed: Jul. 11, 2013

(65) Prior Publication Data
US 2014/0285486 A1 Sep. 25, 2014

Related U.S. Application Data

(60) Provisional application No. 61/803,670, filed on Mar. 20, 2013, provisional application No. 61/809,099, filed on Apr. 5, 2013.

(51) Int. Cl.
*G06T 17/00* (2006.01)
*G06T 7/00* (2006.01)

(52) U.S. Cl.
CPC .............. *G06T 17/00* (2013.01); *G06T 7/0071* (2013.01); *G06T 7/0077* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 6,639,596 B1 | 10/2003 | Shum et al. | |
| 6,677,982 B1 | 1/2004 | Chen et al. | |
| 7,194,112 B2 | 3/2007 | Chen et al. | |
| 2006/0132482 A1 | 6/2006 | Oh | |
| 2008/0247668 A1* | 10/2008 | Li | G06K 9/32 382/285 |
| 2009/0010507 A1* | 1/2009 | Geng | 382/128 |
| 2010/0201682 A1 | 8/2010 | Quan et al. | |
| 2011/0141227 A1 | 6/2011 | Bigioi et al. | |
| 2012/0299920 A1 | 11/2012 | Coombe et al. | |
| 2014/0206443 A1* | 7/2014 | Sharp et al. | 463/31 |

OTHER PUBLICATIONS

Michael Goesele et al: "Multi-View Stereo for Community Photo Collections", Computer Vision, 2007, ICCV 2007, IEEE 11th International Conference ON, IEEE, PI, Oct. 1, 2007, pp. 1-8, XP031194422 DOI: 10.1109/ICCV.2007.4409200, ISBN: 978-1-4244-1630-1, 8 pages.

Shingo Mori et al: "Constructing Immersive Virtual Space for HAI with Photos", Granular Computing (GRC), 2011 IEEE International Conference ON, IEEE Nov. 8, 2011, pp. 479-484, XP032088544, DOI: 10.1109/GRC.2011.6122644, ISBN: 978-1-4577-0372-0, 6 pages.

PCT Search Report dated Feb. 2, 2015, for Application PCT/US2014/030978, 7 pages.

(Continued)

*Primary Examiner* — Hau Nguyen
*Assistant Examiner* — Yi Wang

(57) ABSTRACT

Various disclosed embodiments include methods, systems, and computer-readable media for generating a 3-dimensional (3D) panorama. A method includes receiving images of a 3D scene. The method includes reconstructing geometry of a plurality of 3D bubble-views from the images. Reconstructing includes using a structure from motion framework for camera localization, generating a 3D surface mesh model of the scene using multi-view stereo via cylindrical surface sweeping for each bubble-view, and registering multiple 3D bubble-views in a common coordinate system. The method includes displaying the surface mesh model.

20 Claims, 9 Drawing Sheets

(56) References Cited

OTHER PUBLICATIONS

Ke Colin Zheng et al., "Layered Depth Panoramas" University of Washington, University of Washington, Seattle WA, 8 pages.

Robert T. Collins, "A Space-Sweep Approach to True Mulit-Image Matching", Department of Computer Science, University of Massachusetts, Amhert MA, 8 pages.

Gleb Bahmutov, et al., "Depth Enhanced Panoramas", Purdue University, 2 pages.

Heung-Yeung Shum, et al., "Stereo Reconstruction from Multiperspective Panoramas", Vision Technology Group, Microsoft Research Redmond WA, 8 pages.

Matthew Brown, et al., "Automatic Panoramic Image Stitching Using Invariant Features", Department of Computer Science, University of British Columbia, Vancouver, Canada 16 pages.

Noah Snavely, et al., "Modeling the World from Internet Photo Collections", University of Washington, Seattle WA, 22 pages.

* cited by examiner

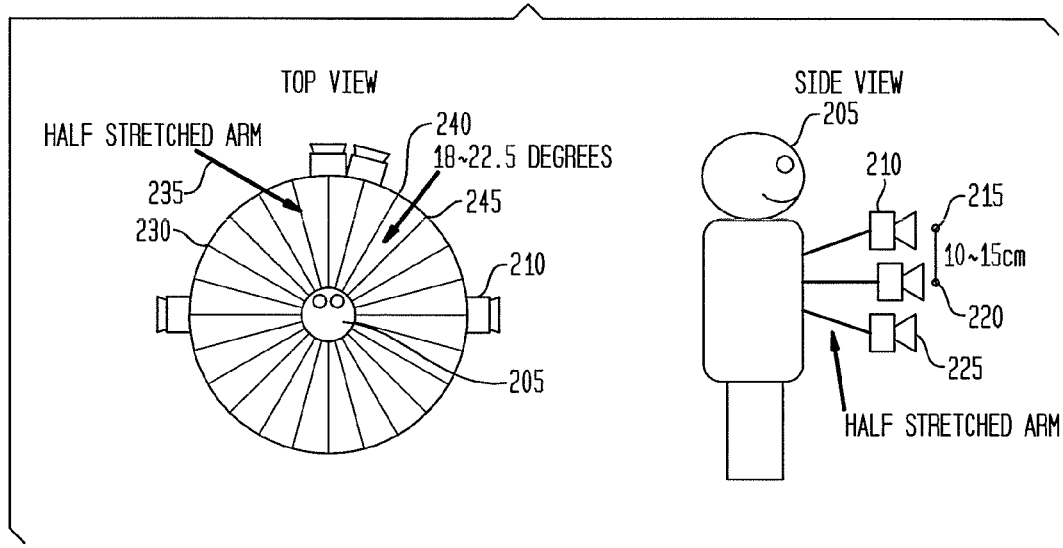
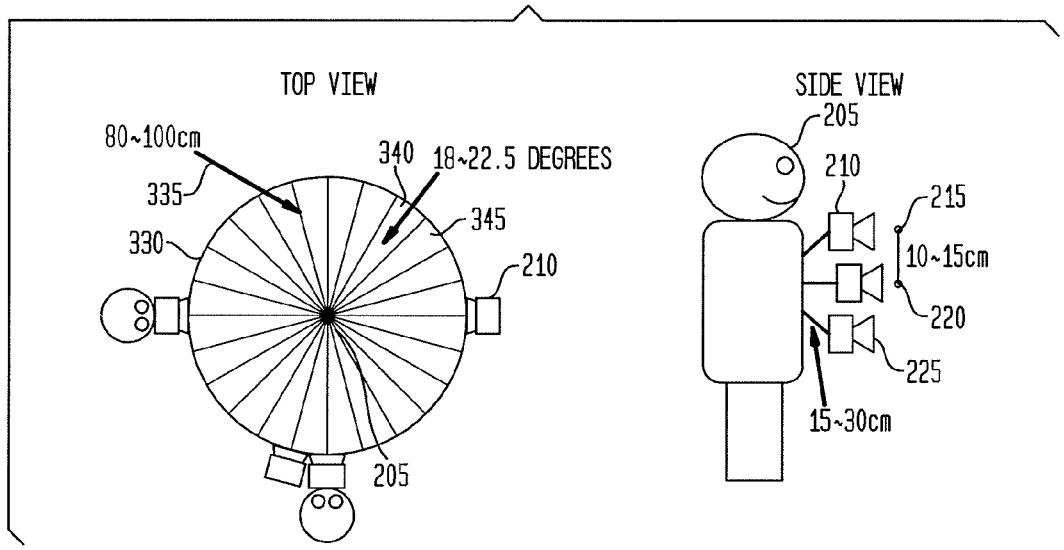

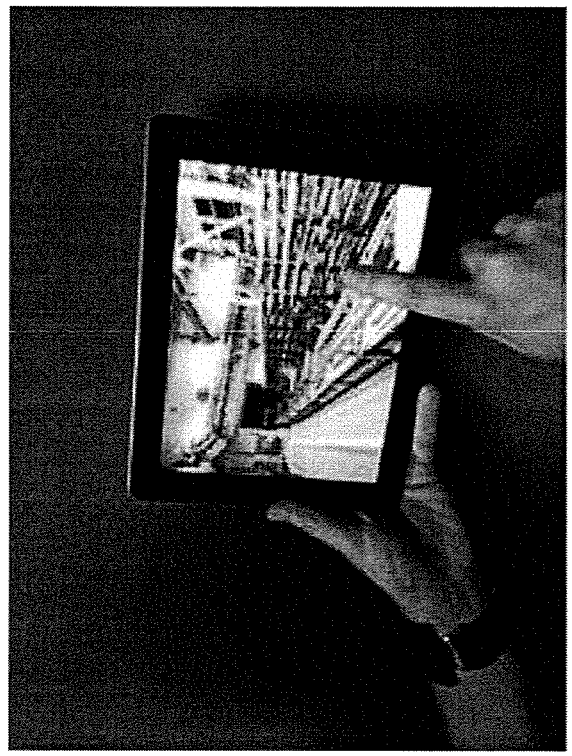
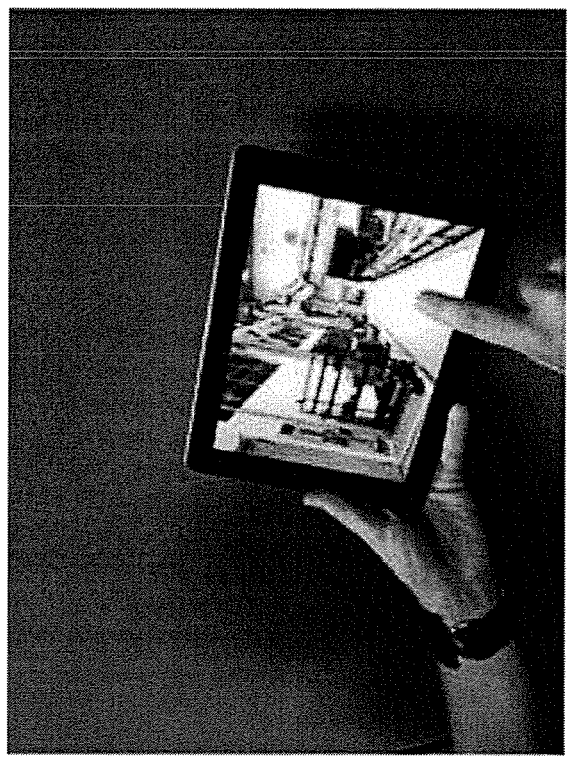
FIG. 7

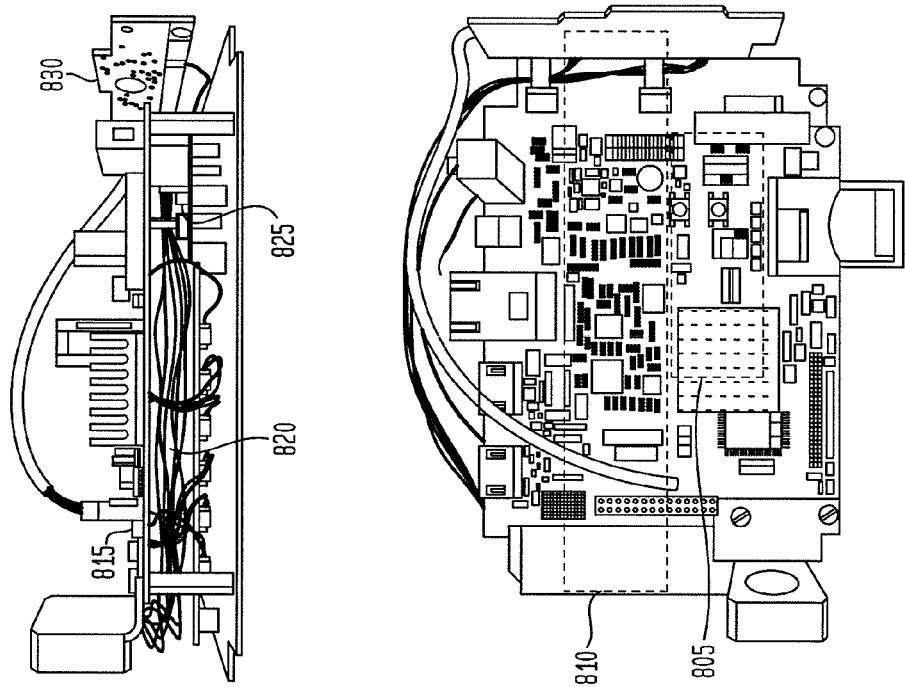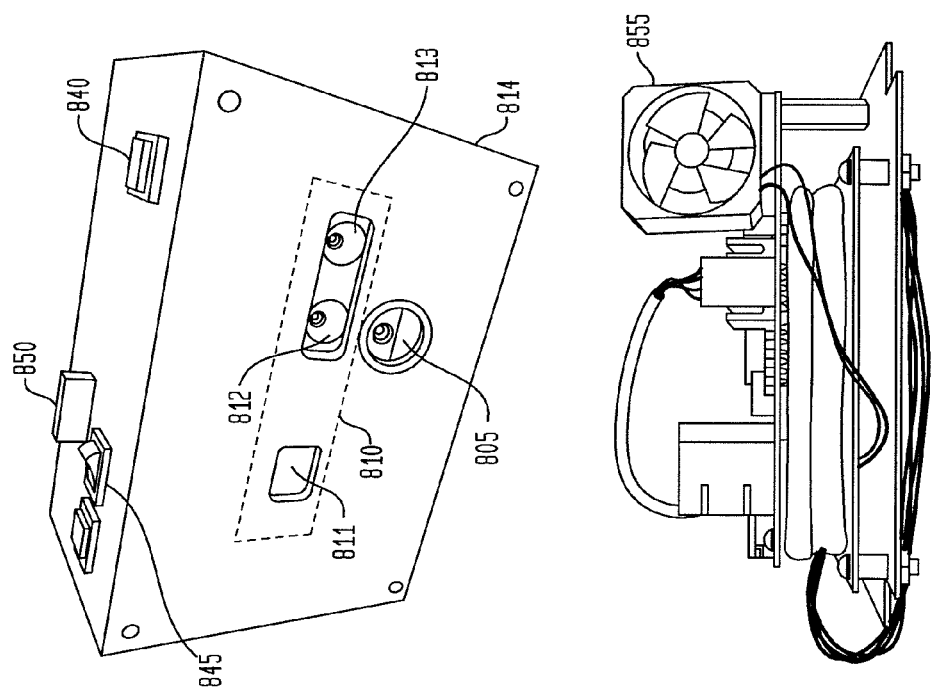
FIG. 8

IMAGE-BASED 3D PANORAMA

CROSS-REFERENCE TO OTHER APPLICATION

The present application is related to, and claims priority to, U.S. Provisional Patent Application No. 61/803,670, filed Mar. 20, 2013, and U.S. Provisional Patent Application No. 61/809,099, filed Apr. 5, 2013, both of which are hereby incorporated by reference into the present application as if fully set forth herein.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include systems and methods for capturing and visualizing 2D and 3D scenes. A method includes receiving images of a 3D scene. The method includes reconstructing geometry of a plurality of 3D bubble-views from the images. Reconstructing includes using a structure from motion framework for camera localization, generating a 3D surface mesh model of the scene using multi-view stereo via cylindrical surface sweeping for each bubble-view, and registering multiple 3D bubble-views in a common coordinate system. The method includes displaying the surface mesh model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 2 illustrates a protocol for short-to-medium range image acquisition in accordance with disclosed embodiments;

FIG. 3 illustrates a protocol for very short range image acquisition in accordance with disclosed embodiments;

FIG. 7 illustrates an exemplary mobile device system display of a visualization in accordance with disclosed embodiments;

FIG. 8 illustrates an exemplary mobile device system hardware configuration for acquiring high resolution images with depth sensing in accordance with disclosed embodiments;

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

"Panorama" is a view synthesis technique that provides 360-degree view visualization for a scene. In its most common form, the two-dimensional ("2D") panorama, visualization is restricted with respect to a fixed view center. While it is sufficient for most visualization purposes, it does not provide functionalities such as three-dimensional ("3D") navigation and measurement, which are useful for factory planning and re-planning.

Disclosed embodiments include image-based 3D panorama techniques, referred to herein as "bubble-view," for providing such functionalities. Its image acquisition can be carried out by one consumer point-and-shoot camera as 2D panoramas, but provides 3D navigation and measurement that previously could only be achieved by expensive 3D laser scanners. The disclosed technique can be successfully applied to imagery acquired from an actual factory site and can be used, for example, by customers involved in business related to factory planning and re-planning, remote monitoring, and product lifecycle management, among others.

Figure 1:
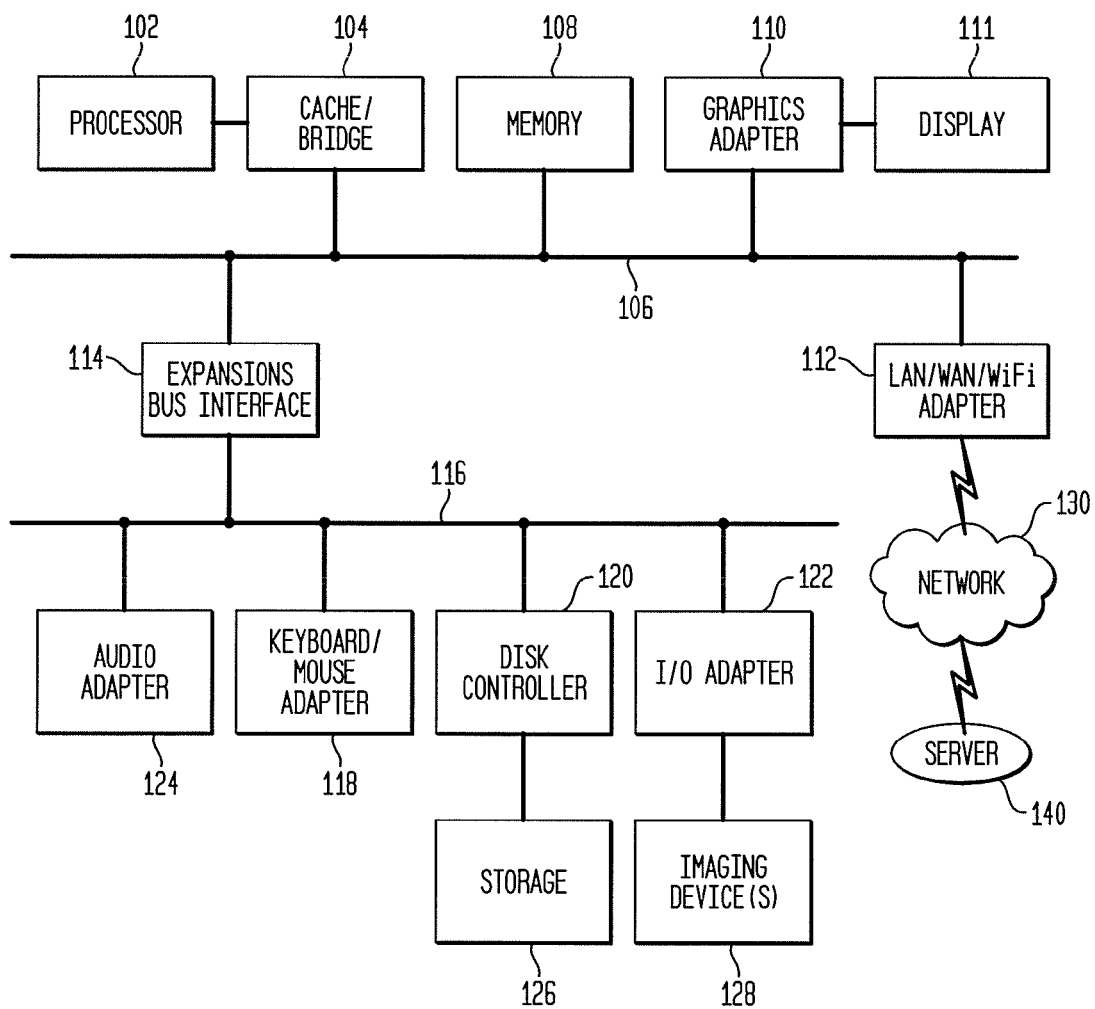
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system illustrated includes a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EE-PROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc. I/O adapter 122 may be connected to imaging device(s) 128, which can be implemented, for example, as one or more of the cameras described herein, as a storage storing image data, or otherwise.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Building a factory for product manufacturing is a huge investment for a company. Therefore, factory planning and re-planning play a key role in configuring the placement of machines and equipment such that the space and work flow can be optimized towards its maximal throughput. With the trend of globalization, a company's factory may be far away from the company's headquarters due to cost and supply considerations. Therefore, remote factory management such as factory planning, re-planning, and monitoring receive increasing attention.

Various approaches and representations can be utilized for remote factory management, ranging from semantic drawing to live video streaming. To enable better visual perception, 2D panoramas can be used for visualization. A 2D panorama is a 360-degree image with respect to a single view center, which can be composed by stitching images from different view angles but sharing a fixed optical center. The fixed optical center restriction can be relaxed for outdoor scenes as the object distance is much larger compared to the variations of optical centers. However, for indoor scenes with much smaller object distances, setup with a tripod may be required to keep the variations of optical center small. Even though 2D panoramas are sufficient for most of the visualization needs, the major downside is that 2D panoramas do not carry 3D depth information. Therefore, visualization is restricted at a fixed view point that hinders functionalities such as 3D measurement, walk through, and navigation.

To partially remedy this shortcoming, 3D laser scanning with lidar scanners has been utilized to measure the depth data such that 3D measurement can be achieved and 3D navigation can be synthesized. However, the hardware cost is much higher than consumer point-and-shoot cameras and less portable due to its size and weight.

In light of the aforementioned issues for 2D panoramas and 3D laser scanning, disclosed embodiments include an image-based 3D panorama technique, the bubble-view, for providing such functionalities. Its image acquisition can be carried out by one consumer point-and-shoot camera as 2D panoramas, but it is capable of providing 3D functionalities that previously could only be achieved by expensive 3D laser scanning.

According to various embodiments, the methodology of creation and visualization of bubble-view can include several modules. First, image acquisition protocols are introduced to serve as the guideline for acquiring images for bubble-view. Next, a single bubble-view reconstruction is carried out by camera localization, multi-view stereo, and depth optimization techniques. An incremental bundle adjustment technique can then be used to register multiple bubble-views for 3D navigation and visualization.

Image Acquisition Protocol: Image-based 3D reconstruction relies on reliable point correspondence across multiple images. Generally, each 3D point requires three views from different view centers in order to achieve 3D estimation. For an indoor scene in a factory setting, the object distance is quite small and varies a lot from 0.5 meter to 12 meters. Therefore, image acquisition protocols may be designed so as to ensure that the acquired images can provide required coverage for 3D estimation.

FIG. 2 illustrates a protocol for short-to-medium range image acquisition in accordance with disclosed embodiments where the smallest object distance is more than 2 meters. This may apply to factories with larger free spaces of working areas and passages. In the illustrated example, a photographer 205 is shown with a camera 210. The camera 210 is illustrated as being held by the photographer 205 at multiple heights above the ground including a first height 215, a second height 220, and a third height 225. In a particular implementation, a distance between the first height 215 and the second height 220 is approximately 10-15 centimeters and a distance between the second height 220 and the third height 225 is approximately 10-15 centimeters; as with all the embodiments illustrated herein, other distances may be used including those that are larger or smaller. As illustrated, the camera 210 is being held by the photographer 205 at a distance of approximately one half arm's length from the photographer's torso. In a particular implementation, the camera 210 is being held by the photographer 205 at a distance of approximately 40 centimeters from the photographer's torso; as with all the embodiments illustrated herein, other distances may be used including those that are larger or smaller.

In the illustrated example, the camera 210 traverses a substantially circular path 230, and the photographer 205 is at or near a center of the circular path 230. The circular path 230 may have a radius 235 substantially equal to the distance that the camera 210 is being held from the photographer's torso; as with all the embodiments illustrated herein, other distances may be used including those that are larger or smaller. To illustrate, the photographer 205 may stand in a single location, while rotating about a point, while holding the camera 210 one half arm's length from the photographer's torso; as with all the embodiments illustrated herein, other distances may be used including those that are larger or smaller. While rotating, the photographer 205 may acquire a series of still images with the camera 210 at each of multiple angular positions about the circular path 230.

For example, the photographer 205 may acquire images at each of the first height 215, the second height 220, and the third height 225 at a first angular position 240, may acquire images at each of the first height 215, the second height 220, and the third height 225 at a second angular position 245, etc. In a particular implementation, the angular positions about the circular path 230 may be substantially evenly spaced. As such, the first angular position 240 may be separated from the second angular position 245 by an angle of approximately 15-22.5 degrees such that the circular path 230 has a total of 20-24 angular positions; as with all the embodiments illustrated herein, other angles may be used including those that are larger or smaller. With three images (e.g., one image at each of the first height 215, the second height 220, and the third height 225) being acquired at each angular position, each bubble-view will have approximately 60-72 images. In a particular implementation, multiple bubble-views may be obtained based on the protocol for short-to-medium range image acquisition described above, where a distance separation between centers of multiple bubble-views is approximately 5-10 meters.

FIG. 3 illustrates a protocol for very short range image acquisition in accordance with disclosed embodiments where the smallest object distance is less than or equal to 2 meters. In the illustrated example, the photographer 205 of FIG. 2 is shown with the camera 210. The camera 210 is illustrated as being held by the photographer 205 at the first height 215, the second height 220, and the third height 225. In the illustrated embodiment, the distance between the first height 215 and the second height 220 is approximately 10-15 centimeters and the distance between the second height 220 and the third height 225 is approximately 10-15 centimeters. As illustrated, the camera 210 is being held by the photographer 205 at a distance of approximately 15-30 centimeters from the photographer's torso.

In the illustrated example, the camera 210 traverses a substantially circular path 330. However, instead of the photographer standing in a single location as illustrated with respect to FIG. 2, the photographer 205 in this exemplary embodiment moves his or her body position along the circular path 330 and traverses the circular path 330 to maximize the object distance within such a short space. In the illustrated embodiment the circular path 330 may have a radius 335 of about 80-100 centimeters. While traversing the circular path 330, the photographer 205 may acquire images with the camera 210 at each of multiple angular positions about the circular path 330.

For example, the photographer 205 may acquire images at each of the first height 215, the second height 220, and the third height 225 at a first angular position 340, may acquire images at each of the first height 215, the second height 220, and the third height 225 at a second angular position 345, etc. In a particular implementation, the angular positions about the circular path 230 may be substantially evenly spaced. As such, the first angular position 340 may be separated from the second angular position 345 by an angle of approximately 15-22.5 degrees such that the circular path 330 has a total of 20-24 angular positions. With three images (e.g., one image at each of the first height 215, the second height 220, and the third height 225) being acquired at each angular position, each bubble-view will have approximately 60-72 images. In a particular implementation, multiple bubble-views may be obtained based on the protocol for very short range image acquisition described above, where a distance separation between centers of multiple bubble-views is approximately 5-10 meters.

Single Bubble-view Reconstruction: To reconstruct the 3D geometry of a single bubble-view, a pipeline of structure from motion (SfM) is first applied to localize a camera pose of each acquired image. The geometry is then estimated via an efficient multi-view stereo matching process with cylindrical surface sweeping as described in further detail with respect to FIG. 4. To resolve depth ambiguities caused by textureless regions and deal with small and abrupt errors, depth optimization is further conducted to refine the estimated 3D geometry of the scene. The output of the bubble-view reconstruction is represented as a surface mesh model centered at a geometry center of all camera optical centers within the bubble-view.

Camera Localization: Camera localization is the foundation for a multi-view 3D reconstruction task. Standard pipeline of structure from motion is publicly available for recovering the camera pose (the motion) and obtaining a sparse point cloud (the structure). The point cloud is sparse because only a few distinct points such as object corners can be easily identified and matched across multiple images. Although it may not be sufficient for 3D navigation, a sparse point cloud can serve as a rough representation of the 3D scene and also provides reliable landmarks for camera localization. The structure from motion framework is capable of recovering the intrinsic parameters such as focal length, principal points, and extrinsic parameters such as camera orientation and translation for each camera. When only one camera is used for image acquisition, disclosed embodiments can fix the intrinsic camera parameters such that the robustness of extrinsic parameter estimation can be further enhanced.

Figure 4:
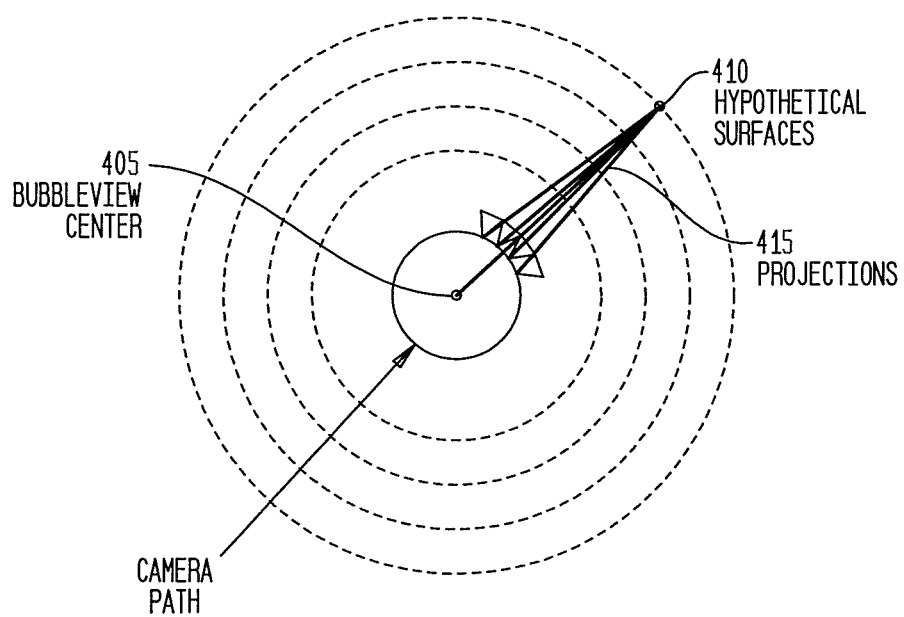
FIG. 4 illustrates cylindrical surface sweeping in accordance with disclosed embodiments.

Multi-View Stereo via Cylindrical Surface Sweeping: FIG. 4 illustrates cylindrical surface sweeping in accordance with disclosed embodiments. The cylindrical surface sweeping process was adapted from Collins' Space-Sweep approach, referenced below. It provides efficient multi-image matching and 3D reconstruction using cameras with known intrinsic and extrinsic parameters. In contrast to an approach that chooses one image as reference and then searches for point correspondences on images from the other cameras based on the epipolar constraints to derive the depth by triangulation, a cylindrical surface sweeping approach as disclosed herein quantizes the scene with multiple depth surfaces with respect to the bubble-view center 405 and hypothesizes the depth of each light ray to be intersecting with one of these surfaces as illustrated by the hypothetical surfaces 410.

Collins' Space-Sweep approach focuses on point-like features such as corners and edgels (edge segments) sparsely distributed on each image, which can be efficiently tested by counting the number of light rays back-projected from all other cameras that intersect on each cell of a depth plane. However, image-based rendering in principle requests depth values for all the light rays of a virtual camera in order to render the novel scene. Therefore, instead of counting the intersecting light rays of each cell on each depth plane, a disclosed surface sweeping process projects the intersecting point of each light ray on each depth surface and then performs forward projection to find the correspondences across multiple cameras as illustrated by the projections 415 in FIG. 4. The best depth hypothesis would have the highest color consistency between these correspondences. Therefore, the reconstructed 3D scene is represented as a 3D surface mesh model comprising intersecting points lying on the best hypothetical surface of each light ray.

Depth Optimization: It can be observed that the depth recovered by surface sweeping is not perfect, especially for object boundaries and homogeneous or textureless regions. The main reason is that surface sweeping estimates depth for each light ray individually; no visibility testing or global optimization is conducted to resolve occlusions and matching ambiguity. To deal with these issues, a depth optimization is conducted to generate a smoother and more correct geometry based on the raw depth estimation obtained by surface sweeping.

A key insight of depth optimization is to explore the depth continuity between each point and its neighboring points. More formally, the optimization can be formulated as a Markov Random Field (MRF) energy minimization problem:

$$E(X) = \sum_{i \in V} E_P(X_i) + \lambda \sum_{(i,j) \in N} E_S(X_i, X_j),$$

where the first term $E_P(X_i)$ represents the photo-consistency cost for assigning the i-th light ray to the particular depth surface $X_i$, and the second term $E_S(X_i, X_j)$ imposes the smoothness constraints that penalizes abrupt depth change between neighboring light rays. V represents all the light rays under consideration, N represents all the neighboring pairs of light rays, and $\lambda$ is a scalar value for weighing the importance between the first term and the second term that contribute to the total energy E(X) of the current assignment X. By imposing the smoothness constraints in the optimization, textureless regions can be correctly estimated with the help of its boundaries where distinct textures or sharp edges carry strong cues for inferring depth. Small and abrupt depth discontinuities caused by erroneous estimation due to occlusions can also be removed.

Figure 5:
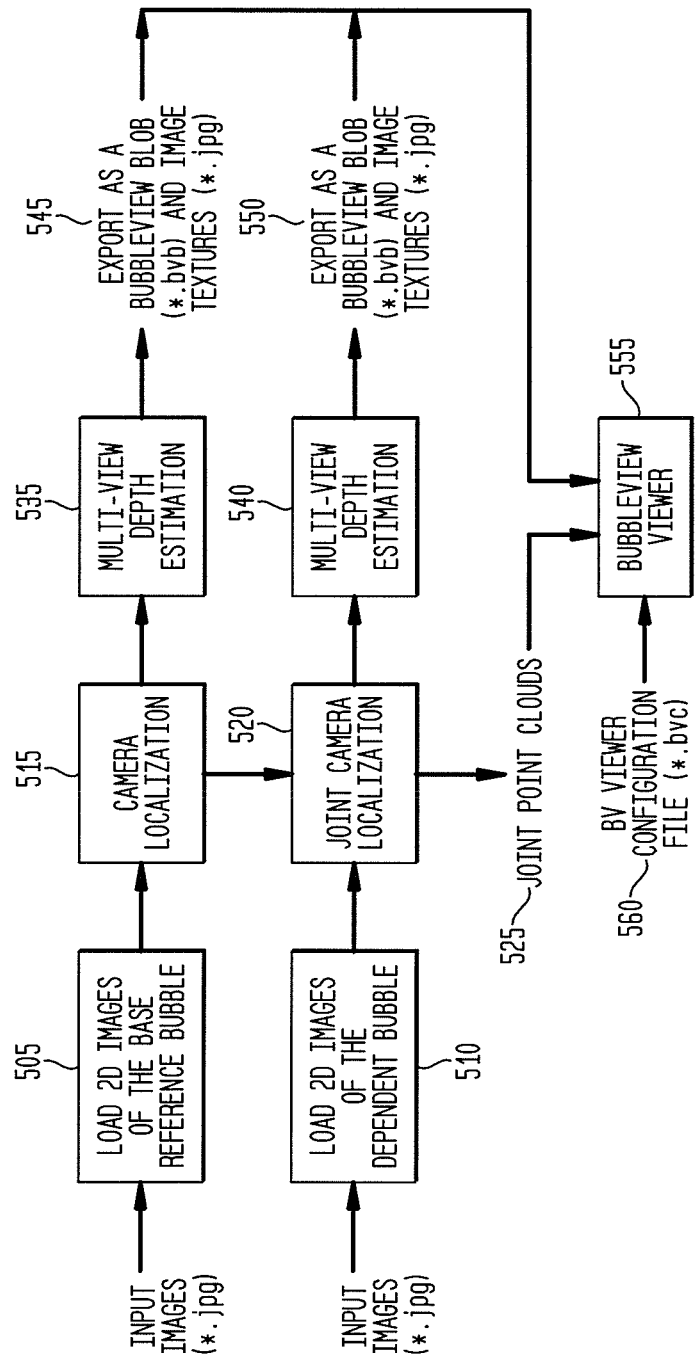
FIG. 5 illustrates a workflow of a multiple bubble-view fusion in accordance with disclosed embodiments.

Multiple Bubble-view Fusion: The goal of multiple bubble-view fusion is to register multiple bubble-views in a common coordinate system, such that 3D navigation across different bubble-views can be achieved. Disclosed embodiments include two approaches to accomplish the goal. The first approach registers partial images from different bubble-views to form a new coordinate system, and then the relative pose from each individual bubble-view is estimated to map images from each bubble-view to the new coordinate system. The second approach jointly estimates the camera pose from different bubble-views while keeping camera pose intact for one bubble-view that serves as the reference bubble-view. The second approach demands higher computation complexity but provides better accuracy for multiple bubble-view registration. The workflow of a multiple bubble-view fusion in accordance with disclosed embodiments is illustrated in FIG. 5.

For example, images of a base reference bubble-view are loaded as illustrated at 505 and images of one or more dependent bubble-views are loaded as illustrated at 510. A camera localization process 515 is performed based at least in part on input received from the base reference bubble-view, and a joint camera localization process 520 is performed based at least in part on input received from the one or more dependent bubble-views. Each camera localization process may be performed as described above. The joint camera localization process 520 may receive input from the camera localization process 515 and produce joint point clouds 525 containing registered sparse point clouds from different bubble-views in a common coordinate system. Thus, a joint point cloud represents distinct points that can be identified and matched across multiple images. A first multi-view depth estimation process 535 is performed based at least in part on input received from the camera localization process 515, and a second multi-view depth estimation process 540 is performed based at least in part on input received from the joint camera localization process 520. A first bubble-view blob (e.g., a data storage structure containing the 3D surface mesh model and camera intrinsic and extrinsic parameters) and image textures 545 is output from the first multi-view depth estimation process 535, and a second bubble-view blob and image textures 550 is output from the second multi-view depth estimation process 540. A bubble-view viewer 555, such as a graphic user interface (GUI) for displaying 3D surface mesh models and navigating within fused multiple bubble-views, is configured to receive the first bubble-view blob and image textures 545, the second bubble-view blob and image textures 550, the joint point clouds 525, and a bubble-view configuration file 560 and display a multiple bubble-view fusion.

Visualization: As mentioned previously, the output of bubble-view reconstruction is a surface mesh model instead of a full 3D model. Therefore, walking through different bubble-views is achieved by dynamically blending multiple mesh models on the fly, where the blending weight is determined by the inverse of squared distance between the current viewing position to nearby bubble-view centers. As all bubble-views acquired from one factory can be registered in the common coordinate system as described above, smooth transition can be accomplished as if the remote user is walking inside the factory.

Figure 6:
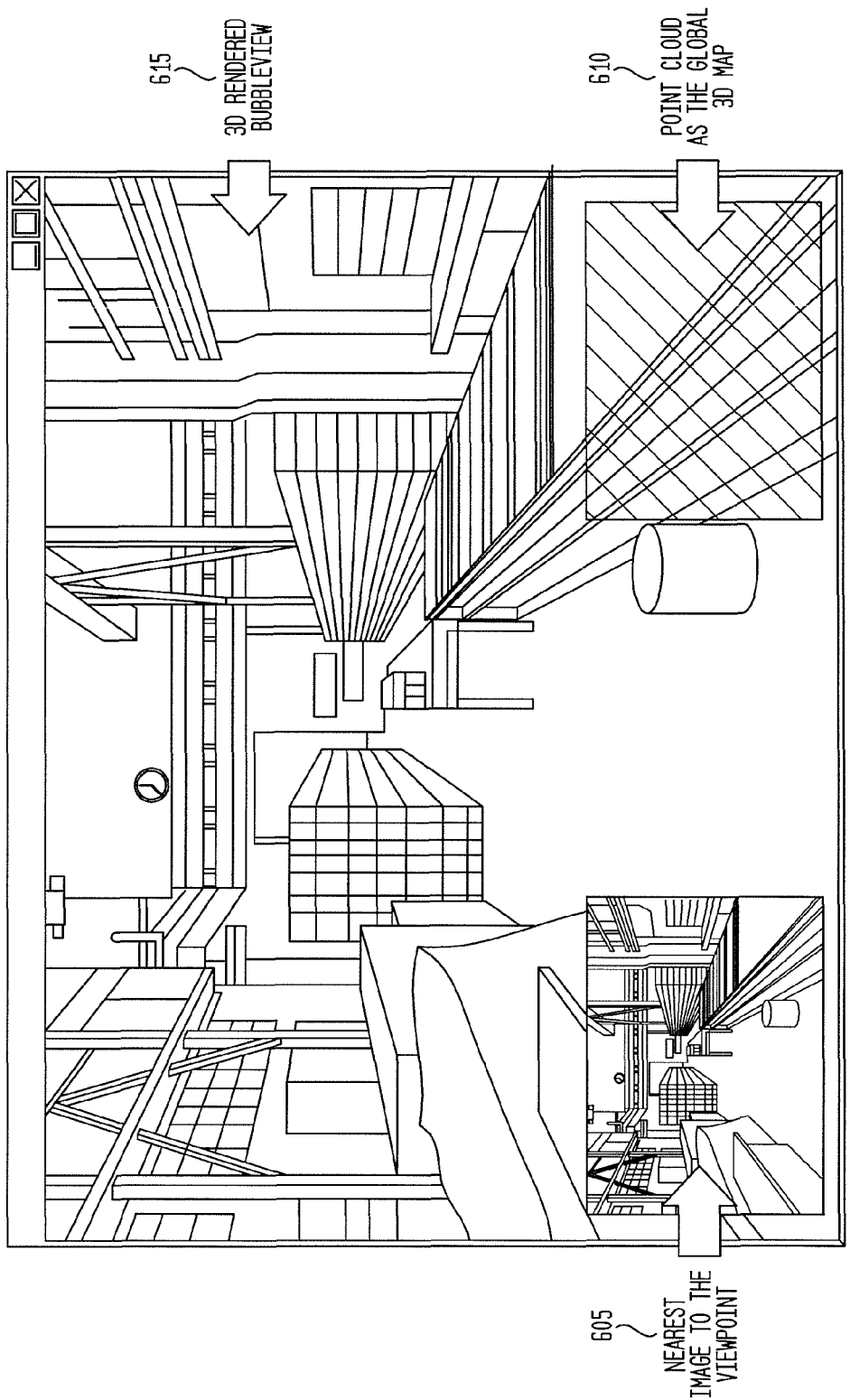
FIG. 6 illustrates an exemplary data processing system display of a visualization in accordance with disclosed embodiments.

FIG. 6 illustrates an exemplary data processing system display 600 of a visualization in accordance with disclosed embodiments. In this exemplary embodiment, images were acquired at a factory. The indoor geometry of the factory is about 20 meters wide and 60 meters long. In total five sets of images are acquired to create five bubble-views. On average, 50 images are acquired for each bubble-view, and the distance between the nearest bubble-views is around 10 meters. As illustrated, the display 600 includes a nearest image to the viewpoint 605, a joint point cloud as a global 3D map 610, and a 3D rendered bubble-view 615. A user of the data processing system display 600 can walk through the 3D rendered bubble-view 615, observe the originally acquired raw image closest to its current viewpoint and viewing direction 605, and use the top-view of the joint point cloud 610 as the map for navigation.

FIG. 7 illustrates an exemplary mobile device system display 700 of a visualization in accordance with disclosed embodiments. In this exemplary embodiment, a mobile operating system application with the same or simplified functionalities as described above with respect to the data processing system display 600 is implemented for use on a mobile device, including but not limited to, a laptop computer, tablet computer, or smart phone.

Various embodiments include image-based 3D panorama reconstruction with cylindrical surface sweeping and multiple panoramas fusion. Disclosed embodiments can use multiple images for 3D panorama reconstruction that enables 3D navigation and measurement for remote factory management. Disclosed embodiments can solve the image-based indoor 3D reconstruction problem using cylindrical surface sweeping, depth optimization via energy minimization, and incremental bundle adjustment for multiple panoramas fusion.

According to various embodiments, the optical centers of acquired images roughly form a circular path instead of roughly sharing a common fixed point; the optical centers of acquired images are in several different heights instead of one single height; the 3D geometry of a single bubble is reconstructed by cylindrical surface sweeping where each mesh vertex is located in one of the cylindrical surfaces with predefined radius to the bubble center; and/or the global registration of different bubbles is performed in a sequential manner by fixing the camera poses of the base bubble.

There are several alternatives to reconstruct a single 3D panorama. The most convenient but expensive way would be using 3D laser scanners with calibrated and RGB cameras to acquire depth and RGB data simultaneously. Manual annotation or specific markers may be required to register multiple panoramas in the common coordinate. A less expensive way would be using a stereo camera to acquire images that cover 360-degree view at fixed location. While it easily generates stereo panoramas at a fixed point, the baseline for the stereo camera is too short to provide accurate depth for reconstruction and global registration in the factory setting, where the depth range varies from 1 meter to more than 15 meters. Recently there is a growing interest in using consumer-level 3D scanners (for example, PrimeSense RGBD Sensors such as Microsoft Kinect Sensor, (available from Microsoft Corporation, Redmond, Wash.) and ASUS Xtion Depth Sensor (available from ASUSTek Computer, Inc., Taipei, Taiwan) for 3D reconstruction. While the consumer-level 3D scanners provide reasonable and fast depth sensing, they typically only work for a restricted depth range (1.2 m-3.5 m). It is possible to integrate such depth sensing with the techniques disclosed above to improve the 3D reconstruction for very close depth range objects.

Example Hardware Configuration: FIG. 8 illustrates an exemplary portable or mobile device system hardware configuration 800 for acquiring high resolution images with depth sensing in accordance with disclosed embodiments. The hardware configuration 800 includes the integration of a camera 805 and a depth sensor 810 with a computer development platform 815. In an exemplary embodiment, the camera 805 may be a webcam, such as a high-resolution Logitech c920 HD Webcam (available from Logitech Corporation, Newark, Calif.), the depth sensor 810 may be an ASUS Xtion RGBD sensor (available from ASUSTek Computer, Inc., Taipei, Taiwan). The depth sensor 810 includes an IR projector 811, an optional low resolution RGB camera 812, and an IR camera 813. As illustrated, the depth sensor 810 is disposed above the camera 805. Alternatively, the depth sensor 810 may be disposed below the camera 805. The computer development platform 815 may be a PandaBoard ES (available from PandaBoard.org), a single-board computer development platform based on the TI OMAP 4430 system on a chip (SoC) manufactured by Texas Instruments (Dallas, Tex.). In a particular embodiment, all the software required for data acquisition is directly running on the system, which enables on-line data streaming to a host PC as well as on-board data storage for off-line processing. The portable device is powered with a battery 820 and includes a universal serial bus (USB) hub 825 and a keyboard controller 830. In an exemplary embodiment, the battery 820 may be an 8400 mAh BeagleJuice battery (available from Liquidware Corporation, Canton, Mass.). The hardware configuration 800 may include a trigger button 840 to capture an image, a power button 845 to turn the unit on and off, a memory card 850 as local storage of software and data, and a cooling fan 855 to prevent overheating of components within a case 814 including the computer development platform 815 and the depth sensor 810.

Data Fusion: The data acquisition can also follow the protocol described above. The acquired data for each shot contains a high-resolution image and a synchronized low-resolution depth data. The depth data enables calculation of the 3D location of each pixel in an image, which forms a dense point cloud in each camera view's local coordinate, which can be transformed into a point cloud in each camera view's local coordinate. To further transform and stitch the dense point clouds acquired from all of the shots into a global coordinate to form a fused point cloud, the camera localization described above is performed to find the global pose of each high-resolution image shot. The global pose of each dense point cloud is then derived based on the calibrated relative pose between the depth sensor and the high-resolution image sensor.

Figure 9:
FIG. 9 illustrates an exemplary fused point cloud in a global coordinate system in accordance with disclosed embodiments.

FIG. 9 illustrates an exemplary fused point cloud 900 in a global coordinate in accordance with disclosed embodiments. The exemplary embodiment illustrates that the fused point cloud in the global coordinate can also help depth optimization for the high-resolution images in addition to the camera localization based on high-resolution images helping register the point cloud derived from the depth sensor as described above. For example, the equation above associated with the depth optimization may be extended as follows:

$$E(X) = \sum_{i \in V} E_P(X_i) + \lambda_D \sum_{i \in V} E_D(X_i) + \lambda_S \sum_{(i,j) \in N} E_S(X_i, X_j)$$

where the first term and the third term are the same as above, while the second term $E_D(X_i)$ penalizes the assigned depth $X_i$ for the i-th light ray deviating from the depth of the fused point cloud, and $\lambda_D$ and $\lambda_S$ are the scalar values for weighting the importance of the second term and the third term, respectively.

Figure 10:
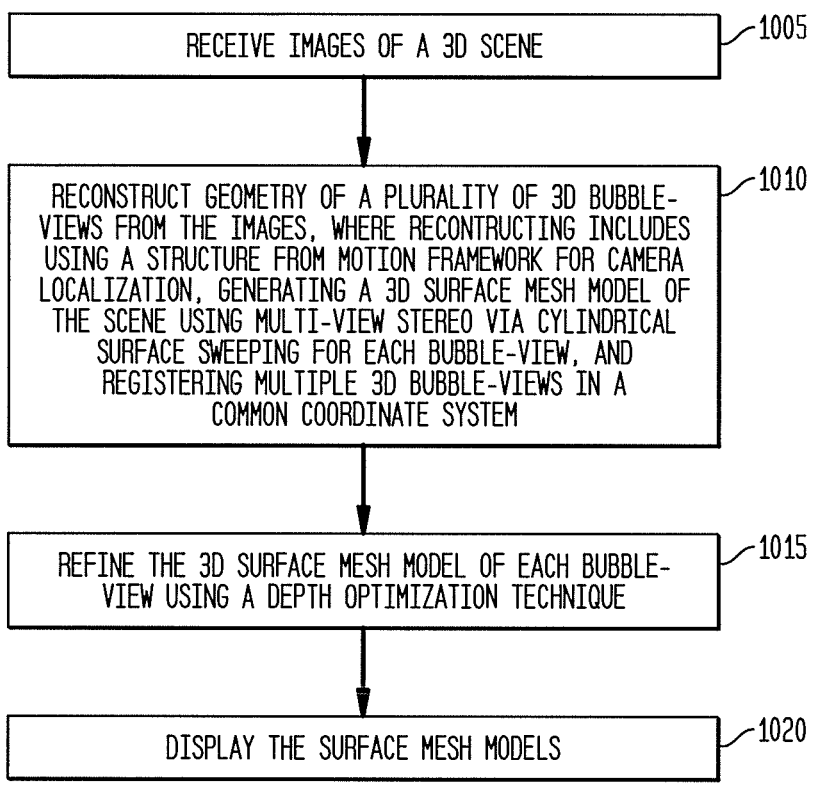
FIG. 10 illustrates a flowchart of a process for capturing and visualizing three-dimensional scenes in accordance with disclosed embodiments.

FIG. 10 illustrates a flowchart of a process for capturing and visualizing three-dimensional scenes in accordance with disclosed embodiments that may be performed, for example, by a PLM or PDM system.

The system receives images of a 3D scene, at step 1005. "Receiving," as used herein, can include loading from storage, receiving from another device or process, receiving via an interaction with a user, and otherwise. For example, as part of this step, the system may receive images acquired by a protocol for short-to-medium range image acquisition as described above with reference to FIG. 2 or by a protocol for very short range image acquisition as described above with reference to FIG. 3.

The system reconstructs geometry of a plurality of 3D bubble-views from the images, at step 1010. For example, when reconstructing, the system utilizes a structure from motion framework for camera localization to recover intrinsic parameters such as focal length and principle points, and extrinsic parameters such as camera orientation and translation for each camera. In addition, when reconstructing, a 3D surface mesh model of each bubble-view is generated using multi-view stereo via cylindrical surface sweeping. For example, when reconstructing, a cylindrical surface sweeping process quantizes the scene with multiple depth surfaces with respect to the bubble-view center 405 of FIG. 4 and hypothesizes the depth of each light ray to be intersecting with one of these surfaces as illustrated by the hypothetical surfaces 410. The intersecting point of each light ray is projected on each depth surface, and then the process performs forward projection to find the correspondences across multiple cameras as illustrated by the projections 415 in FIG. 4.

In addition, when reconstructing, multiple bubble-view fusion is used to register multiple 3D bubble-views in a common coordinate system. For example, partial images from different bubble-views may be registered to form a new coordinate system, and then the relative pose from each individual bubble-view is estimated to map images from each bubble-view to the new coordinate system. In addition, the camera pose from different bubble-views may be jointly estimated while keeping camera pose intact for one bubble-view that serves as the reference bubble-view.

The 3D surface mesh model of each bubble-view may be refined using a depth optimization technique, at step 1015, to generate a smoother and more correct geometry based on the raw depth estimation obtained by surface sweeping. The method includes displaying the surface mesh model, at step 1020.

The techniques disclosed herein include the "bubble-view," an image-based 3D panorama for remote factory management. With the provided image acquisition protocol as the guideline, images can be easily acquired with a single camera for creation and visualization of a factory indoor scene in 3D. Fusion for multiple bubble-views is also addressed which register all bubble-views in the common coordinate system that enables 3D navigation and measurement.

Disclosed embodiments include an integrated device combing 2D and 3D sensors for 3D panorama reconstruction, and technology that uses multiple RGB images and depth images for 3D panorama reconstruction that enables 3D navigation and measurement for remote factory management. Disclosed embodiments solve the indoor 3D reconstruction problem using camera localization, data fusion, and depth optimization via energy minimization.

The following United States patents and United States Patent Publications are incorporated by reference: U.S. Pat. No. 6,677,982, U.S. Pat. No. 7,194,112, US20110141227, U.S. Pat. No. 6,639,596, US20060132482, and 20120299920.

The following Publications are incorporated by reference: N. Snavely, S. M. Seitz, and R. Szeliski, *Modeling the world from Internet photo collections*, International Journal of Computer Vision, 80(2):189-210, November 2008, R. T. Collins, *A space-sweep approach to true multi-image matching*, Proc. IEEE Conference on Computer Vision and Pattern Recognition, 1996, and M. Brown and D. G. Lowe, *Automatic panoramic image stitching using invariant features*, International Journal of Computer Vision, 74(1):59-73, 2007, Heung-Yeung Shum, R. Szeliski, *Stereo reconstruction from multiperspective panoramas*, Proceedings of the Seventh IEEE International Conference on Computer Vision, vol. 1, no. pp. 14-21 vol. 1, 1999, Gleb Bahmutov, Voicu Popescu, and Elisha Sacks, *Depth Enhanced Panoramas*, Proceedings of the conference on Visualization '04 (VIS '04), 2004, and Ke Colin Zheng, Sing Bing Kang, Michael Cohen, and Richard Szeliski, *Layered Depth Panoramas*, Proceedings of IEEE Computer Vision and Pattern Recognition, 2007.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for generating a 3-dimensional (3D) panorama, the method performed by a data processing system and comprising:
receiving, by the data processing system, images of a 3D scene;
reconstructing, by the data processing system, geometry of a plurality of 3D bubble-views from the images, wherein reconstructing includes:
using a structure from motion framework for camera localization;
generating a 3D surface mesh model of the scene using multi-view stereo via cylindrical surface sweeping for each bubble-view, wherein the cylindrical surface sweeping quantizes the scene with multiple depth surfaces with respect to a bubble view center and hypothesizes a depth of each light ray to be intersecting with one of the depth surfaces, wherein an intersecting point of each light ray is projected on each depth surface, and thereafter the cylindrical surface sweeping performs forward projection to find correspondences across multiple cameras; and
registering multiple 3D bubble-views in a common coordinate system, wherein registering multiple 3D bubble-views in a common coordinate system comprises registering partial images from different bubble-views to form a new coordinate system, and estimating a relative pose from each bubble-view to map images from each bubble-view to the new coordinate system; and
displaying the surface mesh models.

2. The method of claim 1, wherein reconstructing further comprises: refining the 3D surface mesh model of each bubble-view using a depth optimization technique that utilizes a smoothness constraint to resolve issues caused by textureless regions of the scene.

3. The method of claim 1, wherein the camera localization is used for registering a point cloud acquired from a synchronized depth sensor to form a fused point cloud in a global coordinate system.

4. The method of claim 3, wherein the fused point cloud is utilized for refining the 3D surface mesh model with a depth optimization technique.

5. The method of claim 1, wherein incremental bundle adjustment is utilized to register the multiple 3D bubble-views.

6. A data processing system for generating a 3-dimensional (3D) panorama comprising:
a processor; and
an accessible memory, the data processing system particularly configured to:
receive images of a 3D scene;
reconstruct geometry of a plurality of 3D bubble-views from the images,
wherein reconstructing includes:
using a structure from motion framework for camera localization;
generating a 3D surface mesh model of the scene using multi-view stereo via cylindrical surface sweeping for each bubble-view, wherein the cylindrical surface sweeping quantizes the scene with multiple depth surfaces with respect to a bubble view center and hypothesizes a depth of each light ray to be intersecting with one of the depth surfaces, wherein an intersecting point of each light ray is projected on each depth surface, and thereafter the cylindrical surface sweeping performs forward projection to find correspondences across multiple cameras; and
registering multiple 3D bubble-views in a common coordinate system, wherein registering multiple 3D bubble-views in a common coordinate system comprises registering partial images from different bubble-views to form a new coordinate system, and estimating a relative pose from each bubble-view to map images from each bubble-view to the new coordinate system; and
display the surface mesh models.

7. The data processing system of claim 6, wherein the data processing system is further configured to:
refine the 3D surface mesh model of each bubble-view using a depth optimization technique that utilizes a smoothness constraint to resolve issues caused by textureless regions of the scene.

8. The data processing system of claim 6, wherein the camera localization is used for registering a point cloud acquired from a synchronized depth sensor to form a fused point cloud in a global coordinate system.

9. The data processing system of claim 8, wherein the fused point cloud is utilized for refining the 3D surface mesh model with a depth optimization technique.

10. The data processing system of claim 6, wherein incremental bundle adjustment is utilized to register the multiple 3D bubble-views.

11. The data processing system of claim 6, wherein the images of the 3D scene are acquired using a short-to-medium range image acquisition protocol.

12. The data processing system of claim 6, wherein the images of the 3D scene are acquired using a very short range image acquisition protocol.

13. A non-transitory computer-readable medium encoded with executable instructions that, when executed, cause one or more data processing systems to:
receive images of a 3D scene;
reconstruct geometry of a plurality of 3D bubble-views from the images,
wherein reconstructing includes:
using a structure from motion framework for camera localization;
generating a 3D surface mesh model of the scene using multi-view stereo via cylindrical surface sweeping for each bubble-view, wherein the cylindrical surface sweeping quantizes the scene with multiple depth surfaces with respect to a bubble view center and hypothesizes a depth of each light ray to be intersecting with one of the depth surfaces, wherein an intersecting point of each light ray is projected on each depth surface, and thereafter the cylindrical surface sweeping performs forward projection to find correspondences across multiple cameras; and
registering multiple 3D bubble-views in a common coordinate system, wherein registering multiple 3D bubble-views in a common coordinate system comprises registering partial images from different bubble-views to form a new coordinate system, and estimating a relative pose from each bubble-view to map images from each bubble-view to the new coordinate system; and
display the surface mesh model.

14. The computer-readable medium of claim 13, further encoded with computer-executable instructions that, when executed, cause the data processing system to:

refine the 3D surface mesh model of each bubble-view using a depth optimization technique that utilizes a smoothness constraint to resolve issues caused by textureless regions of the scene.

15. The computer-readable medium of claim 13, wherein the camera localization is used for registering a point cloud acquired from a synchronized depth sensor to form a fused point cloud in a global coordinate system.

16. The computer-readable medium of claim 15, wherein the fused point cloud is utilized for refining the 3D surface mesh model with a depth optimization technique.

17. The computer-readable medium of claim 13, wherein incremental bundle adjustment is utilized to register the multiple 3D bubble-views.

18. A method for generating a 3-dimensional (3D) panorama, the method performed by a data processing system and comprising:
receiving, by the data processing system, images of a 3D scene;
reconstructing, by the data processing system, geometry of a plurality of 3D bubble-views from the images, wherein reconstructing includes:
using a structure from motion framework for camera localization;
generating a 3D surface mesh model of the scene using multi-view stereo via cylindrical surface sweeping for each bubble-view, wherein the cylindrical surface sweeping quantizes the scene with multiple depth surfaces with respect to a bubble view center and hypothesizes a depth of each light ray to be intersecting with one of the depth surfaces, wherein an intersecting point of each light ray is projected on each depth surface, and thereafter the cylindrical surface sweeping performs forward projection to find correspondences across multiple cameras; and
registering multiple 3D bubble-views in a common coordinate system, wherein registering multiple 3D bubble-views in a common coordinate system comprises jointly estimating a camera pose from different bubble-views while keeping the camera pose intact for one bubble-view that serves as the reference bubble-view; and
displaying the surface mesh models.

19. A data processing system for generating a 3-dimensional (3D) panorama comprising:
a processor; and
an accessible memory, the data processing system particularly configured to:
receive images of a 3D scene;
reconstruct geometry of a plurality of 3D bubble-views from the images, wherein reconstructing includes:
using a structure from motion framework for camera localization;
generating a 3D surface mesh model of the scene using multi-view stereo via cylindrical surface sweeping for each bubble-view, wherein the cylindrical surface sweeping quantizes the scene with multiple depth surfaces with respect to a bubble view center and hypothesizes a depth of each light ray to be intersecting with one of the depth surfaces, wherein an intersecting point of each light ray is projected on each depth surface, and thereafter the cylindrical surface sweeping performs forward projection to find correspondences across multiple cameras; and
registering multiple 3D bubble-views in a common coordinate system, wherein registering multiple 3D bubble-views in a common coordinate system comprises jointly estimating a camera pose from different bubble-views while keeping the camera pose intact for one bubble-view that serves as the reference bubble-view; and
display the surface mesh models.

20. A non-transitory computer-readable medium encoded with executable instructions that, when executed, cause one or more data processing systems to:
receive images of a 3D scene;
reconstruct geometry of a plurality of 3D bubble-views from the images, wherein reconstructing includes:
using a structure from motion framework for camera localization;
generating a 3D surface mesh model of the scene using multi-view stereo via cylindrical surface sweeping for each bubble-view, wherein the cylindrical surface sweeping quantizes the scene with multiple depth surfaces with respect to a bubble view center and hypothesizes a depth of each light ray to be intersecting with one of the depth surfaces, wherein an intersecting point of each light ray is projected on each depth surface, and thereafter the cylindrical surface sweeping performs forward projection to find correspondences across multiple cameras; and
registering multiple 3D bubble-views in a common coordinate system, wherein registering multiple 3D bubble-views in a common coordinate system comprises jointly estimating a camera pose from different bubble-views while keeping the camera pose intact for one bubble-view that serves as the reference bubble-view; and
display the surface mesh model.

* * * * *